United States Patent
Warden et al.

(10) Patent No.: US 8,751,563 B1
(45) Date of Patent: Jun. 10, 2014

(54) GEOTRIBING

(75) Inventors: Thomas Warden, Belmont, CA (US); Eric Huls, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 512 days.

(21) Appl. No.: 12/827,912

(22) Filed: Jun. 30, 2010

(51) Int. Cl.
*G06F 15/16* (2006.01)

(52) U.S. Cl.
USPC .......................... 709/203; 709/224; 370/328

(58) Field of Classification Search
USPC .......................................................... 709/203
See application file for complete search history.

(56) References Cited

U.S. PATENT DOCUMENTS

| | | | |
|---|---|---|---|
| 5,283,733 A * | 2/1994 | Colley | 340/323 R |
| 7,088,692 B1 * | 8/2006 | Gronroos | 370/328 |
| 2003/0099924 A1 * | 5/2003 | Tsuboi et al. | 434/350 |
| 2003/0101091 A1 * | 5/2003 | Levin et al. | 705/11 |
| 2006/0281544 A1 * | 12/2006 | Frattinger et al. | 463/29 |
| 2007/0268158 A1 * | 11/2007 | Gunderson et al. | 340/933 |

OTHER PUBLICATIONS https://kontsurnous.fr/, printed Feb. 25, 2010.

* cited by examiner

*Primary Examiner* — Hua Fan
(74) *Attorney, Agent, or Firm* — Banner & Witcoff, Ltd.

(57) ABSTRACT

A system and method for evaluating, scoring, and encouraging group performance towards a common goal is disclosed. In an embodiment, individuals of a group have an incentive to encourage other group members to drive better and achieve an improved overall driving score for the group. A group driving score is determined based on the driving performances of members of the group. The group may establish a driving score goal and work toward achieving that goal using real-time group reinforcement communications.

13 Claims, 3 Drawing Sheets

GEOTRIBING

FIELD OF THE INVENTION

The disclosure relates to methods and systems for analyzing group data to evaluate a group as a whole. More particularly, the disclosure provides real-time tools for evaluating and scoring group performance towards a goal while providing encouragement to group members in order to assist overall group performance.

BACKGROUND

In many instances, a group of people that share a common interest or goal may assist each other in achieving that goal through encouragement and communication with others that share the same common interest or goal. For example, a group of people may share a common interest in lowering their insurance cost by showing that they practice good driving habits. However, real-time tools for evaluating and scoring group driving performance are not readily available.

Also, the receipt of encouragement from other group members to assist in improving overall group performance is currently provided in a haphazard and inconsistent fashion. For instance, a group of drivers may meet on occasion, such as every few months, and share experiences in an attempt to learn from each others experiences. However, such untimely feedback does not provide group members with consistent real-time feedback that would assist them to quickly and efficiently improve overall group driving performance.

In addition, real-time tools for determining others that may be interested in participating in a group are also not readily available. Currently, most people through email or networking web sites determine that they share a common interest with others. It would be advantageous to have a real-time tool that indentifies people that share a common interest so that they may join together and encourage each other in reaching a common goal. Also, such a real-time tool may allow groups of people having a common interest to join together to gain additional market power.

Therefore, there is a need in the art for a system and method for evaluating and scoring group performance towards a goal while providing encouragement to group members in order to assist overall group performance.

SUMMARY

Aspects of the disclosure overcome problems and limitations of the prior art by providing a system and method for fostering group reinforcement towards a common goal. Individual members may discover each other and create a group that shares a common interest. The group may be evaluated as a whole as the group works together to function as a team. The group may be evaluated and scored based on an average of the score of the individuals, or the data collected for the group can be analyzed collectively to provide a single score for the entire group. The individuals of the group have an incentive to encourage other group members to drive better and achieve an improved score for the group. Where individuals within the group have real-time information regarding the other members of the group, they can provide instantaneous feedback to a group member to encourage improved scoring behavior.

In an aspect of the disclosure, a group driving score is determined based on the driving performances of members of the group. The group may establish a driving score goal and work toward achieving that goal using real-time group reinforcement communications.

Additional aspects of the invention involve determining from a collection of people a group of two or more people that share at least one common interest around which they wish to share or pool resources. The formation of a group of people sharing a common interest may allow them to gain additional market power. For example, if a group of four strangers all want pizza for lunch, the methods and system disclosed below may identify these four people and collectively negotiate on their behalf (i.e., act as agent) with various local vendors/retailers. Aspects of the disclosure may provide each person with directions to the vendor/retailer and other instructions for obtaining the discount or coupon.

The details of these and other embodiments of the present disclosure are set forth in the accompanying drawings and the description below. Other features and advantages of the disclosure will be apparent from the description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Exemplary Operating Environment

In the following description of the various embodiments, reference is made to the accompanying drawings, which form a part hereof, and in which is shown by way of illustration, various embodiments of the invention that may be practiced. It is to be understood that other embodiments may be utilized.

Figure 1:
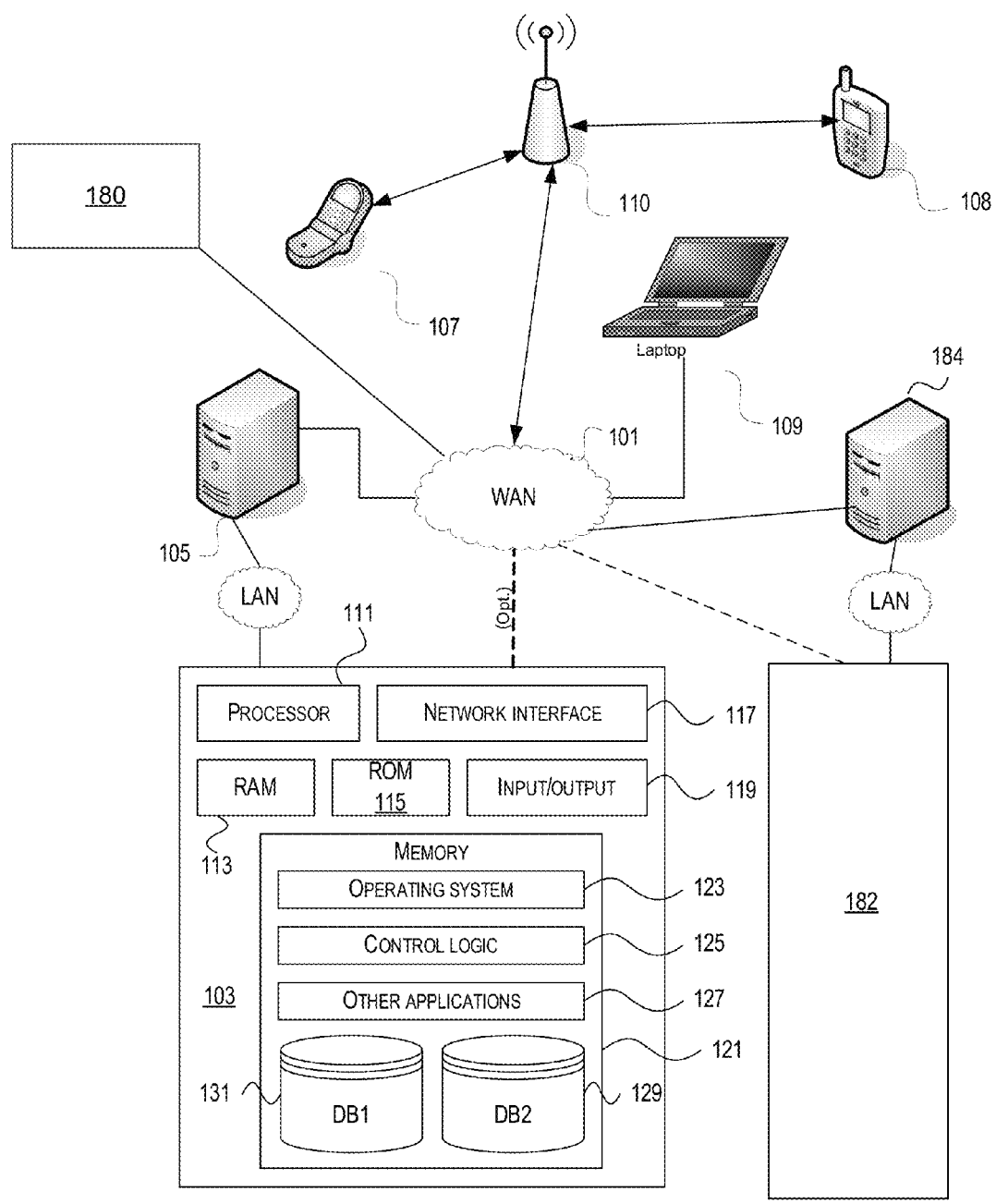
FIG. 1 shows a diagram of a group evaluating and scoring computer system that may be used to implement aspects of the disclosure.

FIG. 1 illustrates one example of a network architecture that may be used to implement one or more illustrative aspects of the invention. Various network nodes 103, 105, 107, 108, and 109 may be interconnected via a wide area network (WAN) 101, such as the Internet. Other networks may also or alternatively be used, including private intranets, corporate networks, LANs, wireless networks, cellular networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 108, and 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include common interest server 103, driver information server 105, cellular telephone 107, personal digital assistant 108, user computer 109, data collector 180, goal information server 184, and scoring/evaluating server 182. Cellular telephone 107 and personal digital assistant 108 may be connected to WAN 101 via a cellular network 110. Those skilled in the art will realize that other network-enabled devices, such as a mobile terminal, personal video recorder, portable or fixed television, personal computer, digital camera, digital camcorder, portable audio device, portable or fixed analog or digital radio, or combinations thereof may also be connected to WAN 101 and utilized with various aspects of the invention.

Common interest server 103 provides overall access, control and administration of databases and control software for performing one or more illustrative aspects of the invention as described herein. Common interest server 103 may be connected to driver information server 105 through which users interact with and obtain data as requested. Common interest server 103 may be connected to driver information server 105 through the network 101 (e.g., the Internet), via direct or indirect connection, or via some other network. Users may interact with the common interest server 103 using cellular telephone 107, personal digital assistance 108, and/or remote computer 109 e.g., using a web browser to connect to the common interest server 103 via one or more externally exposed web sites hosted by driver server 105 or another web hosting server.

Scoring/evaluating server 182 may provide group scoring and evaluation in accordance with one or more illustrative aspects of the disclosure. Scoring/evaluating server 182 may be connected to goal information server 184 through which users interact with and obtain data as requested. Scoring/evaluating server 182 may be connected to goal information server 184 through network 101 (e.g., the Internet), via direct or indirect connection, or via some other network. Users may interact with scoring/evaluating server 182 using cellular telephone 107, personal digital assistance 108, and/or remote computer 109 e.g., using a web browser to connect to the common interest server 103 via one or more externally exposed web sites hosted by goal information server 184 or another web hosting server.

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by common interest server 105 and driver information server 103, scoring/evaluation server 182, and goal information server 184 may be combined onto a single server.

Common interest server 103 may include a processor 111 for controlling overall operation of the common interest server 103. Those skilled in the art will realize that scoring/evaluating server 182, goal information server 184, and driver information server 105 may have similar or different architecture as described with respect to device 103. For instance, each of these servers may include RAM, ROM, network interfaces, I/O interfaces, processors, and memory.

Common interest server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for common interest server 103 to perform aspects of the invention as described herein, and other application software 127 providing secondary support, and/or other functionality which may or may not be used in conjunction with aspects of the present disclosure. The control logic may also be referred to herein as the common interest server software 125. Functionality of the common interest server software may refer to operations or decisions made automatically based on rules coded into the control logic, made manually by a user providing input into the system, and/or a combination of automatic processing based on user input (e.g., queries, data updates, etc.). Those skilled in the art will realize that components 105, 107, 108, and 109 may also include similar hardware components (e.g., processor, RAM/ROM, memory, etc. . . . ) as discussed above with respect to common interest server 103.

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 108, and 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Exemplary Embodiments

Figure 2:
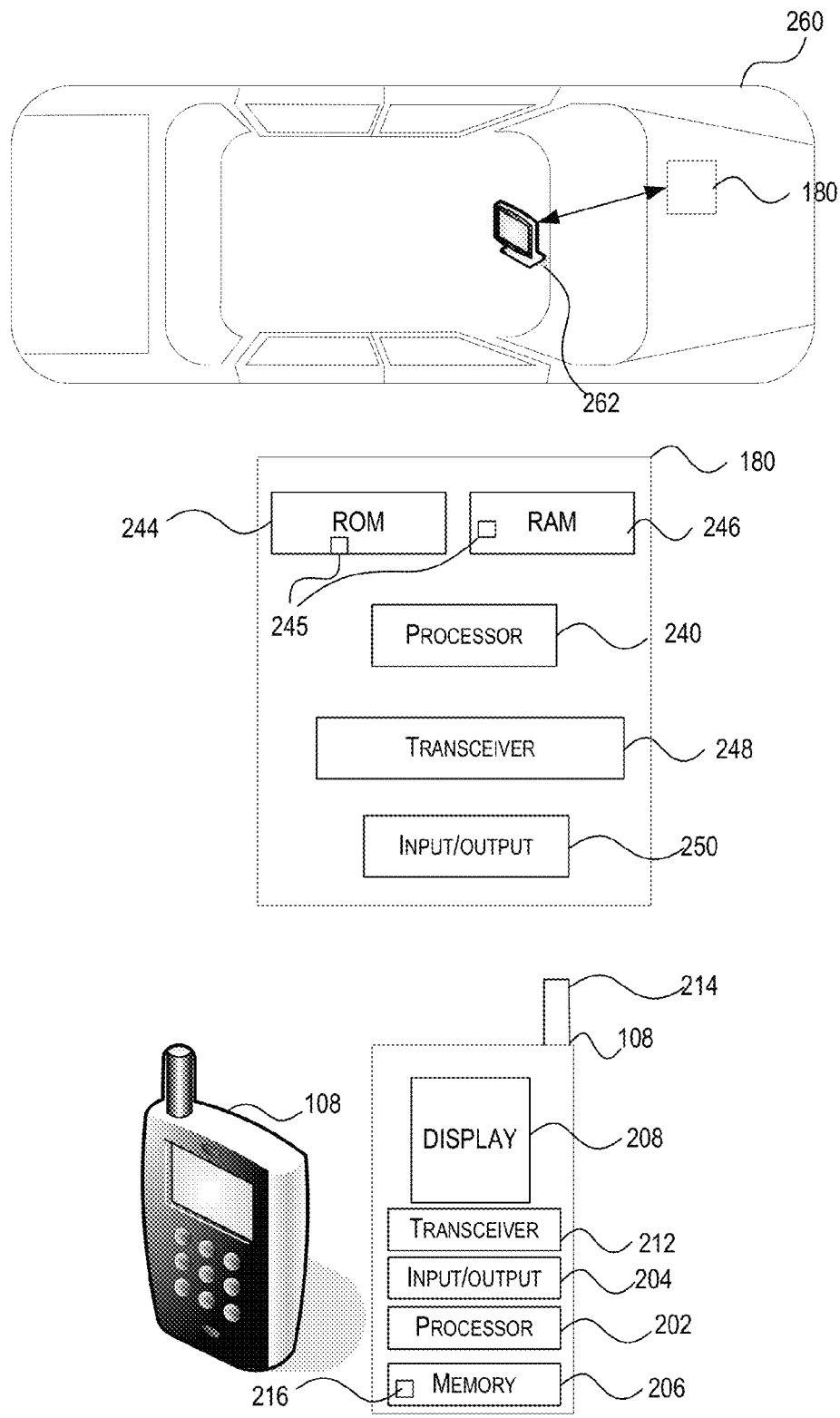
FIG. 2 illustrates devices that may be utilized to evaluate, score, and encourage group performance in accordance with an aspect of the disclosure.

FIG. 2 illustrates exemplary hardware configurations that may be utilized for evaluating and scoring group performance towards a goal while providing encouragement to group members in order to assist overall group performance. Various group goals are contemplated using the various techniques described in this disclosure. Improving a group driving score is used in the below illustrative examples, but other group goals are envisioned. Such goals may include improving financial position of group members, becoming more energy conscious, and achieving a group weight loss goal.

As shown in FIG. 2, a PDA 108 or a data collector 180 may be used to collect data regarding group performance. PDA 108 or other portable mobile devices may be used to collect data in various remote or indoor locations. As shown in FIG. 2, PDA device 108 may include a processor 202 connected to user interface 204, a memory 206 and/or other storage, and a display 208. PDA device 108 may also include a battery (not shown), a speaker (not shown), a transceiver 212, and an antenna 214. User interface 204 may further include at least one input device (not shown) such as keypad, touch screen, voice interface, one or more arrow keys, joy-stick, data glove, mouse, roller ball, touch screen, or the like.

Computer executable instructions and data used by processor 202 and other components within PDA 108 may be stored in a computer readable memory 206. The memory may be implemented with any combination of read only memory modules or random access memory modules, optionally including both volatile and nonvolatile memory. Software 216 and/or an application module including software may be stored within memory 206 and/or storage to provide instructions to processor 202 for enabling PDA 108 to perform various functions. Alternatively, some or all of PDA's 108 computer executable instructions may be embodied in hardware or firmware (not shown).

FIG. 2 further illustrates an automobile 240 including data collector 180 and display 262. Data collector 180 may include a processor 242, ROM 244, RAM 246, a transceiver 248, and at least one input/output device 250. Software 245 and/or an application module including software may be stored within ROM 244 and/or RAM 246 to provide instructions to processor 240 for enabling data collector 180 to perform various functions. Alternatively, some or all of data collector's 108 computer executable instructions may be embodied in hardware or firmware (not shown).

Data collector 180 may collect data from the available operational data from an industry standard port such as a SAE-1962 connector of automobile 260 or from an on board diagnostic ("OBD") port or other vehicle data acquiring component. For example, operation data accessible via the OBDII port may include speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. . . . .

Data collector 180 may also include a global positioning system "GPS" to track location of automobile 260. Other known locating technologies such as radio frequency tags, cellular telephone networks, or differential GPS may also be used. Such technologies are hereinafter referred to as "GPS" technology or locators.

The data collected via data collector 180 and/or PDA 108 may be recorded or transferred to various removable electronic storage devices, including but not limited to flash memory cards. Alternatively, recorded data may be transferred remotely via wireless technology currently known as Bluetooth®. Other wireless communication systems such as cellular telephone, radio or satellite may also be used. These technologies are hereinafter termed "wireless" transfer or technology. In another embodiment, the data collected via data collector 180 and/or PDA 108 may be stored locally by each device for processing either internally or externally by a central server system.

In an aspect of the disclosure, an application module 216 may be installed on PDA 108. The application module 216 may query other programs stored in PDA 108 to determine common interests of the PDA 108 user. For instance, the query may search e-mail and calendar programs for particular types of data such as sports team interests, social group events, and hobby information. In another embodiment, common interests may be determined by geographical location via GPS. For instance, a user located in a clothing store is probably shopping for clothes.

In another embodiment, users may enter their own interests directly into a user interface screen. Upon receipt of a user's interests, other devices may be analyzed to determine if they include similar interests. Interests may be searched for at some regular known time period (weekly, daily etc. . . . ). Alternatively, interests may be searched in real-time when recognized changes occur. In an embodiment, a text message or e-mail may be sent to those that have been discovered to have common interests. The text message or e-mail may be an invitation to join a group. In an embodiment, the initial message may be automatically generated by system such as an introductory text message. Other forms of messaging (picture mail, tweets, etc. . . . ) or additional information such as alternative contact information may be forwarded (Vcard etc. . . . ).

In another aspect of the invention, a data collector 180 may be used to store information such as information regarding a user's driving performance. A user of such a device may be interested in improving their driving experience and reducing overall insurance costs. Other drivers with similar interests may join together to form a group around their shared common interest of improving their driving experience.

In an aspect of the invention, a metric such as a driver safety rating score may be used to access overall performance of a group of drivers. The driver safety rating score may take into account various factors for each driving event or trip segment such as acceleration rate, speed, excessive braking, time of day driving, miles driven per trip, weather conditions, road conditions, sharp cornering, behavior relative to traffic congestion, and various other factors. A score for each driving event or trip segment may be generated and included in an overall group score. In an embodiment, the overall group score may be available in real-time to the current driver and to other members of the group. In additional other real-time feedback may be available to the current driver. For instance, the real-time feedback may include warnings of driving above a posted speed limit, warning that the vehicle is approaching a stop sign, or the time remaining before a traffic control light is to change from green to yellow or red, etc. . . . . In another embodiment, the feedback may include notice of construction or other traffic delays.

In an aspect of the disclosure, messages may be automatically sent based on score updates or on some regular scheduled time frame. For instance, a message may be sent when an individual completes additional increments of driving (every 10 hours of recorded driving time). The messages may include an updated individual driving score and/or overall group score.

In another embodiment, group members may send short messages encouraging others in the group such as "John, nice driving score to Florida, and with the whole family in the car too." Messages may also be informational or in the form of queries (Route 90 pothole alert! Joe, are you wearing your seat belt? etc. . . . ).

The message may be displayed on display 262. Real-time driving scores for each member of the group and/or a group score may be displayed and/or monitored by each member of the group. The display may include summary graphics or scorecard type information. An event logging algorithm may allow a user to save particular displayed information and tag it with notes or other comments for later use. In an embodiment, the display may be provided on a GPS or other display system in the car.

In another embodiment, the message may not be displayed until automobile 260 is parked or not moving. In an alternative embodiment, the message may be translated into an audio format and played via display 262 and/or the automobile 260 sound system during vehicle operation.

In another aspect of the disclosure, real-time monitoring may include geographical information such as displaying location of each group member on a map. Driving scores may be displayed for those group members that may be driving. Members of a group may receive, on a cell phone or computer, the real-time driving scores of other members in the group while the other members are driving. The driving score may include a score for the particular trip that is in progress. The non-driving members can then provide feedback to the driving members to encourage better driving to achieve a better score.

In another aspect of the disclosure, group members may send messages to other group members real-time to encourage good driving behavior and/or practices. Users may share experiences such as how to drive in icy or slick driving conditions when weather reports indicates that snow or rain is expected. For instance, a teenager that is driving may be monitored by other teen drivers. Such real-time monitoring may encourage those in the group to drive safely because they know that they may be watched by others in their peer group.

In an embodiment, real-time monitoring creates a self-policing atmosphere because other members in the group receive information on driving performance. Each member may monitor how each person in the group contributes to the overall group driving score. For instance, drivers' habits may be monitored such as the wearing of seatbelts during even short trips. A message from other members to this driver to remember to wear their seatbelt may encourage the driver to always wear their seat belt. Other driving habits that may be monitored or determined may include alertness of a driver when driving (during early morning commutes), timely performance of car maintenance, and use of turn signals. The group may be able to determine how these habits are reflected in a driving score and encourage others to correct these mental driving lapses. Because group members may be monitoring, drivers may be more conscious of practicing safe driving habits.

In an embodiment, parents may monitor teen driving score and/or scores of teen peers for comparison. If your score is below a certain number, you may not use the car this weekend.

In another embodiment, different groups may share their score with each other. For instance, at a high school (or college) different social groups may compete for prizes for the best driving score as a group (baseball team versus volleyball team). Student groups may be awarded with free music downloads, special parking spaces, and gift cards. Additional rewards may include reduced insurance premiums, deductible waivers (or discounts) for an accident, concierge services, automobile club memberships, free towing coverage, and/or vacation discounts.

In yet another embodiment, groups showing a high enough score may receive money for college or automobile purchase discounts. The rewards may be sponsored by companies or institutions that may want to advertise that they sponsor programs that promote save driving by teens. Other types of rewards for achievement of a particular level of accomplishment may include charitable donations on behalf of the group, or a symbolic recognition of the accomplishment such as a sign or sticker to place in or on a car stating the goal achieved.

In an additional embodiment, students in a high school may be divided into separate teams (aka groups). One particular team may include four students: Ann, Bill, Claire and Douglas. Driver scores may be collected for the team for a fixed period of time. In an embodiment, the fixed period of time may be three months. Driver scores may be collected for each driver in the team and a team driving score may be calculated based on the individual driver scores.

In an embodiment, the individual driver scores may be calculated based on each driving event or trip. For instance, during a particular trip, a data collector 180 collects data regarding various aspects of the trip. In an embodiment, the data collector 180 collects data including vehicle speed, vehicle location during trip, time duration of trip, length of trip, number of hard braking events, number of high acceleration events, sharp cornering, use of seat belt and time of day.

In an aspect of the disclosure, data stored in data collector 180 may be transmitted to and received by scoring/evaluating server 182. In an embodiment, the data may be transmitted and received real-time while the driver continues their trip.

In an aspect of the disclosure, scoring/evaluating server 182 may include a processor and memory for determining an individual driving score for the driver based on information received during the driving performance. Data including external data (such as weather data, current driving road conditions data, posted speed limits data, vehicle location via GPS data, etc. . . . ) may also be received and used to determine the individual driving score.

In an aspect of the disclosure, the scoring/evaluating server 182 executes a driver score algorithm to determine a driving score. The scoring/evaluating server 182 may verify accuracy of data through comparisons of different data sets. For instance, distance driven may be determined through GPS data and verified by odometer readings and/or speed distance calculations. In an embodiment, the calculated driver score may be determined real-time and shared with other members of the group.

In another embodiment, the driver score may include an initial base score. The driver score may be increased based on receipt from data collector 180 of information reflecting any one or more of the following: (1) use of seat belt, (2) vehicle movement at a speed at or below the posted limit, and (3) driving during daylight hours. The driver score may also be decreased based on receipt from the data collector 180 of information reflecting any one or more of the following: (1) hard braking events, (2) high acceleration events, (3) sharp cornering, (4) driving after 10:00 pm, (5) driving above the posted speed limit, and (6) driving more than 10 mph over the posted speed limit. Those skilled in the art will realize that additional factors may increase and/or decrease a driver's score and the above list is merely exemplary of such factors.

In an aspect of the disclosure, a formula for a driver score may be represented by the following formula:

Driver Score=[Initial Base Score]+[use of seat belt constant]+[vehicle movement at or below posted limit constant*amount of driving time in hours (rounded to next 0.2 hours)]−[hard braking constant*number of hard braking events/amount of driving time in hours(rounded to next 0.2 hours)]–[high acceleration constant*number of high acceleration events/amount of driving time in hours(rounded to next 0.2 hours)]–[sharp cornering constant*number of sharp cornering events/amount of driving time in hours(rounded to next 0.2 hours)]–[vehicle movement above posted limit constant/amount of driving time in hours(rounded to next 0.2 hours)–[vehicle movement more than 10 mph above posted speed limit constant*number of twelve minute increments of vehicle movement more than 10 mph above posted speed limit].

In another aspect of the disclosure, a driver score may be transmitted to a vehicle such as automobile 260 via a mobile device similar to PDA 108. In another embodiment, the driver score may be calculated in the vehicle through use of data collector 180 or an on-board driver score processor. The most recently updated (or real-time) score may be transmitted to the driver through the sound system of the car or through other means (visual and audio) such as display 262.

The driver score may also be sent to group members through various networks and network nodes. For instance, a wireless network or cellular network 101 may be used to transmit and receive information regarding team member scores or communications between group members. In the above exemplary embodiment: Ann, Bill, Claire, and Douglas may send messages to each other real-time to encourage good driving behavior and/or practices. The messages may be in the form of phone calls, emails, text message, and alerts. Ann, Bill, Claire, and Douglas may also view these messages when appropriate on display 262. In an embodiment, this real-time monitoring may encourage Ann, Bill, Claire, and Douglas to drive safely because they know that they may be watched by others in their peer group.

In another embodiment, data collector 180 may warn a driver when a particular driver's score falls below an established threshold. For instance, if during a driving segment a driver score falls below an acceptable threshold, data collector 180 may initiate warnings to the driver (via car audio, display 262, or vehicle instrument display) that their current driving behavior is negatively impacting their calculated driving score. Such warning may also be shared with other group members real-time. If the current driving behavior as reflected in the driving score is determined to be dangerous, a notification may be forwarded to guardian of a younger driver or owner of a vehicle. In another embodiment, automobile 260 may restrict its top speed to a predetermined maximum speed if the real-time trip score falls below a certain level.

In an aspect of the disclosure, a group driving score for Ann, Bill, Claire, and Douglas may also be determined. In an embodiment, the group driving score may be determined based on the driving performances of members of the group. In addition, the group may establish a driving score goal and work toward achieving that goal using real-time communications. In another embodiment, groups may have flexibility in altering their group composition, if needed. For instance, an option may be provided for a group to terminate a member and thereby not include a member's trip score in the overall group score for various reasons.

In another aspect of the disclosure, reports may be generated real-time at the conclusion of every trip. The reports may be transmitted to all group members for review. In addition, monthly, quarterly or yearly reports may also be automatically generated based on the groups needs.

In an embodiment, various reports may be used as the basis to determine if the group has earned a prize or reward. For instance, Ann, Bill, Claire, and Douglas may receive different display signs for placement in their automobiles based on achieving various predetermined group driving scores.

Figure 3:
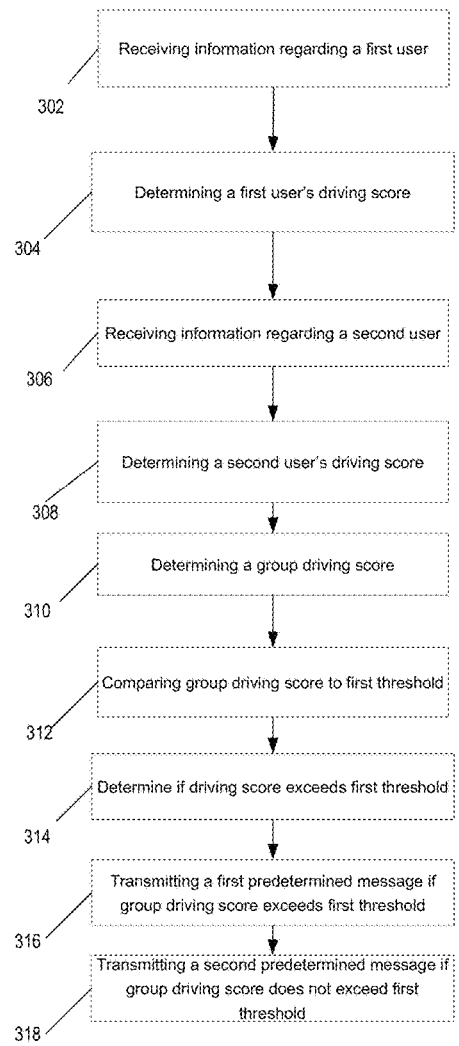
FIG. 3 illustrates a method of evaluating, scoring, and encouraging a group performance in accordance with an aspect of the disclosure.

FIG. 3 illustrates a method of evaluating, scoring, and encouraging group performance in accordance with an aspect of the disclosure. In FIG. 3, at step 302 driving data regarding a first user is received. Next, at step 304 the first user's driving score is determined based on the received information. In step 306, driving data regarding a second user is received. Next, at step 308 the second user's driving score is determined based on the received information. In step 310, based on the received data for the first user's driving performance and the second user's driving performance, a group driving score may be determined. Next, in step 312 the determined group driving score may be compared to a first threshold value. The first threshold value may represent the numerical goal value to be achieved by the group or may be a value at which group members desire that certain information be distributed to all group members. Next, at step 314 it is determined whether the group driving score exceeds the first threshold value. If the group driving score exceeds the first threshold, a first predetermined message may be transmitted at step 316. The first predetermined message may include information such as the overall group score and a congratulatory message that tells the group that they obtained a score that currently exceeds their goal. The first predetermined message may also include information for current drivers to assist them to improve the overall group driving score even further. If the group driving score does not exceed the first threshold, then a second predetermined message may be transmitted at step 318. The second predetermined message may include information such as the overall group score and information to assist current drivers to improve the overall score. In an embodiment, group members may forward correspondence such as texts or e-mails to other group members to provide encouragement or advised to improve the overall group score.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A computer-implemented method of improving a group driving score, the method comprising:
   (a) receiving, at a common interest server, data regarding a driving performance for a first user;
   (b) determining, by the common interest server, a first user's driving score based on the received first user's driving performance;
   (c) receiving, at the common interest server, data regarding a driving performance for a second user;
   (d) determining, by the common interest server, a second user's driving score based on the received second user's driving performance;
   (e) based on the received data for the first user's driving performance and the second user's driving performance, determining, by the common interest server, a group driving score;
   (f) transmitting, by the common interest server, the determined group driving score to the first user and the second user;
   (g) comparing, by the common interest server, the determined group driving score to a first threshold;
   (h) if the determined group driving score exceeds a first threshold, transmitting, by the common interest server, a first predetermined message to the first and second user, the first predetermined message comprising information to assist the first user and the second user to improve the group driving score; and (i) if the determined group driving score does not exceed the first threshold, transmitting, by the common interest server, a second predetermined message to the first and second user, the second predetermined message comprising information to assist the first user and the second user to improve the group driving score.

2. The method of claim 1, further comprising:
(j) transmitting, by the common interest server, the determined first user's driving score, the determined second user's driving score, and the determined group driving score to at least all members of the group.

3. The method of claim 1, further comprising:
(j) receiving, at the common interest server, at least one communication from another group member regarding the determined group driving score.

4. The method of claim 3, further comprising:
(k) transmitting, by the common interest server, the received at least one communication to all members of the group.

5. The method of claim 1, wherein the first predetermined message includes an indication that the determined group driving score exceeds a predetermined goal.

6. The method of claim 1, wherein the second predetermined message includes an indication that the determined group driving score falls short of a predetermined goal.

7. The method of claim 6, wherein the first and second predetermined messages comprise text messages.

8. The method of claim 6, wherein the first and second predetermined messages comprise e-mail messages.

9. The method of claim 5, wherein the first predetermined message further includes an indication that a reward has been achieved based on the determined group driving score exceeding a predetermined goal.

10. An apparatus comprising:
a memory;
a display;
a processor coupled to the memory and programmed with computer-executable instructions for performing steps comprising:
(a) receiving data regarding a driving performance for a first user;
(b) determining a first user's driving score based on the received first user's driving performance;
(c) receiving data regarding a driving performance for a second user;
(d) determining a second user's driving score based on the received second user's driving performance;
(e) based on the received data for the first user's driving performance and the second user's driving performance, determining a group driving score;
(f) transmitting the determined group driving score to the first user and the second user;
(g) comparing the determined group driving score to a first threshold;
(h) if the determined group driving score exceeds a first threshold, transmitting a first predetermined message to the first and second user, the first predetermined message comprising information to assist the first user and the second user to improve the group driving score; and
(i) if the determined group driving score does not exceed the first threshold, transmitting a second predetermined message to the first and second user, the second predetermined message comprising information to assist the first user and the second user to improve the group driving score.

11. The apparatus of 10, wherein the processor is further programmed with computer-executable instructions for performing steps comprising:
(j) transmitting the determined first user's driving score, the determined second user's driving score, and the determined group driving score to at least all members of the group.

12. The apparatus of 10, wherein the processor is further programmed with computer-executable instructions for performing steps comprising:
(j) receiving at least one communication from another group member regarding the determined group driving score.

13. The apparatus of 12, wherein the processor is further programmed with computer-executable instructions for performing steps comprising:
(k) transmitting the received at least one communication to all members of the group.

* * * * *